United States Patent [19]

Madden

[11] 3,774,866

[45] Nov. 27, 1973

[54] DIFFERENTIAL VELOCITY METER

[75] Inventor: Gilbert F. Madden, Redlands, Calif.

[73] Assignee: The United States of America as represented by the Secretary of the Air Force, Washington, D.C.

[22] Filed: Dec. 17, 1968

[21] Appl. No.: 785,066

[52] U.S. Cl. .................................. 244/3.2, 73/504
[51] Int. Cl. ... F42b 15/02, F42b 15/10, F42b 15/00
[58] Field of Search ........................... 244/3.2, 3.21

[56] References Cited
UNITED STATES PATENTS
3,476,129  11/1969  Halstenberg .................. 244/3.2

*Primary Examiner*—Samuel Feinberg
*Assistant Examiner*—Thomas H. Webb
*Attorney*—Harry A. Herbert, Jr. and Henry S. Miller, Jr.

[57] ABSTRACT

An inertial guidance system for measuring the difference between programmed and actual velocity change in a missile including a sensor for converting a velocity change to a shaft angle located between the sensor case and a pendulous gyro mounted on an internal turntable and means for converting the analog angle indication to digital read out data.

4 Claims, 1 Drawing Figure

PATENTED NOV 27 1973   3,774,866
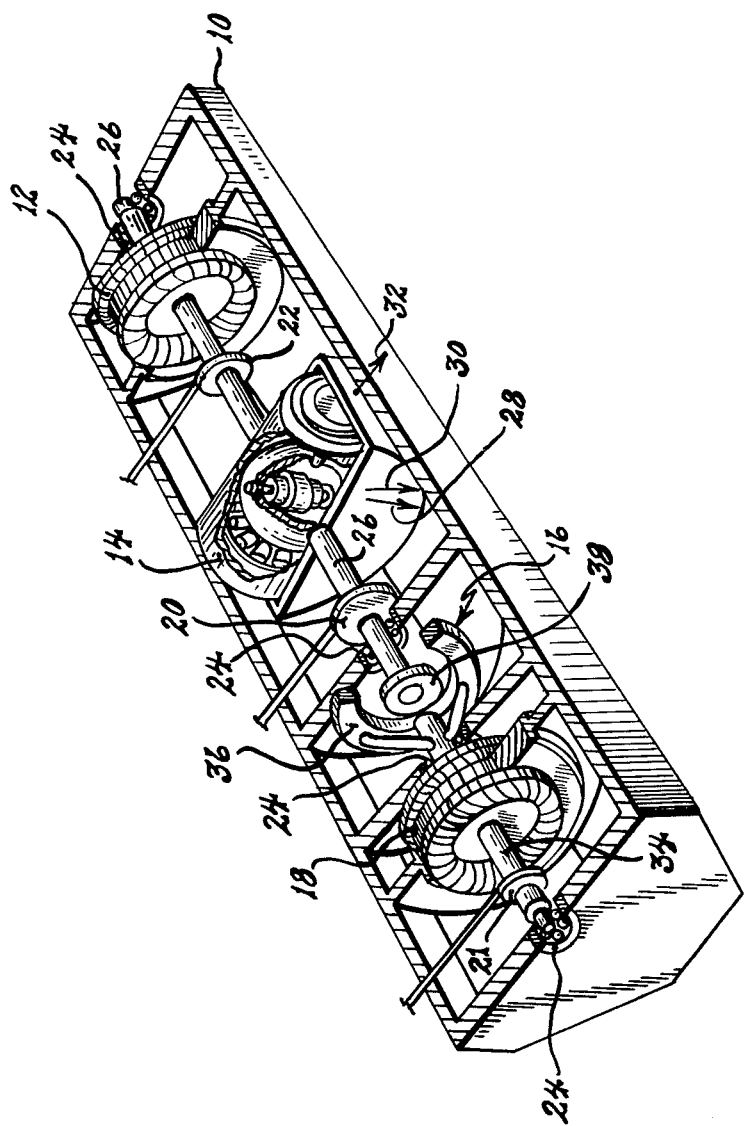
INVENTOR.
GILBERT F. MADDEN
BY Harry A. Herbert Jr.
ATTORNEY
Henry S. Miller Jr.
AGENT

DIFFERENTIAL VELOCITY METER

BACKGROUND OF THE INVENTION

This invention relates generally to velocity meters, and more specifically to a means for measuring the difference between a programmed velocity and an actual velocity by means of an internal guidance system in a missile. Generally, systems for guiding missiles are based on one of two concepts. The first concept involves the use of radio communication in the form of telemetry, ground-based computers, and radar. These systems base their control on the ability to maintain contact with the missile from the ground. In the event that radio contact is lost, the missile will destroy itself and be lost.

The second concept is based on inertial guidance wherein the missile is launched and for a short time may be guided by ground signals but after a programmed period or on command from the gound, is switched to an inertial guidance system contained within the missile itself. In this case, contact between ground and the missile has no bearing on the missile performance once it has left ground and is on its programmed flight path.

Alternatively, manned spacecraft may use a combination system wherein a conventional telemetry-type of guidance is provided with an inertial guidance backup to be used in the event of communication failure.

Besides a complete break in communications, telemetry signals may become distorted due to sun spots, excessive X-ray and gamma ray radiation, and exoatmospheric nuclear or atomic radiation. Further, the components of the electronic gear aboard a missile may become damaged by such radiation unless adequate shielding or "hardness" is provided for. The shielding is of necessity formed from high-density materials, such as lead, so it is apparent then that any considerable amount of shielding will require either a vast increase in fuel load for the missile or, alternatively, it will cut down the range of the missile drastically.

It has, therefore, been found that if an accurate, reliable and invulnerable inertial guidance system can be provided, it would allow a missile to be fired with complete confidence as to its accuracy with only a slight increase in weight caused by the use of mechanical parts rather than transistors and micro-electronic circuits. Inertial systems have been devised for controlling the yaw, pitch and roll axes of a missile. However, no accurate system has yet been devised which will measure the difference between a programmed velocity and actual velocity. Heretofore, all systems required the use of electronics. The invention about to be disclosed provides a system whereby an analog signal is derived which is significant of any change in velocity of the missile from the programmed velocity.

SUMMARY OF THE INVENTION

This invention solves the problem of measuring the difference between a programmed and an actual velocity change without the necessity of measuring the actual velocity change. The invention furnishes the required difference without the complexity of equipment necessary to read out the total velocity change and the rapid data handling equipment necessary to obtain the difference to high precision.

The apparatus employed to achieve the objects of this invention includes sensors which convert a velocity change to an analog shaft angle between the sensor case located in the missile and a pendulous gyro mounted on an internal turntable. The sensors may be pendulous integrating gyro accelerometers which are modified to provide the desired result, and readout is obtained by converting the indicated analog angle to digital data of the necessary quantization and precision.

The sensors generate a shaft angle between the sensor case and a specified-angle shaft internal to the case. The specified-angle shaft will be rotated with respect to the case by a specified-angle motor at the same angular rate with respect to the case as the pendulous gyro turntable is programmed to have. The angle between the specified-angle shaft and the turntable shaft will represent a deviation from the programmed velocity change.

The angle between the two shafts, or trigonometric functions of the angle, will be read out by an incremental or whole angle digital encoder or by an electrical analog angle resolver or transducer.

The specified-angle motor is a conventional electrical stepper motor or a stepper motor which is modified to reduce the required data rate of electrical pulses to the stepper without a corresponding sacrifice of quantization. The modified stepper would apply some continuous drive between pulses but the shaft rotation would be corrected to the incremental angle by each pulse.

It is therefore an object of this invention to provide a new and improved inertial guidance system for missiles and rockets.

It is a further object of this invention to provide a new and improved differential velocity meter for missiles.

It is another object of this invention to provide a new and improved differential velocity meter which measures the difference between a programmed velocity and an actual velocity change without measuring the actual velocity change.

It is still a further object of this invention to provide a new and improved differential velocity meter which uses no vacuum tubes or semiconductor components.

It is still another object of this invention to provide a new and improved differential velocity meter that uses no active electronic components.

It is another object of this invention to provide a new and improved differential velocity meter for an inertial guidance system that is invulnerable to all types of radiation.

It is another object of this invention to provide a new and improved differential velocity meter which has an analog output.

It is another object of this invention to provide a differential velocity meter which is economical to produce and utilizes conventional, currently available components that lend themselves to standard mass-production manufacturing techniques.

These and other advantages, features and objects of the invention will become more apparent from the following description taken in connection with the illustrative embodiment in the accompanying drawing.

IN THE DRAWING

The FIGURE is a perspective view partially in section of the differential velocity meter of this invention.

DESCRIPTION OF THE PREFERRED EMBODIMENT

Referring now to the FIGURE, the case 10 is mounted, by means not shown, in the guidance section of the missile. Within the case there is a turntable servo motor 12, a pendulous integrating gyro unit 14, an angle transducer or resolver shown generally at 16 which may be analog or digital and finally a specified angle motor 18. These components are connected generally in series along the longitudinal axis of the case 10. Slip rings 20, 21 and 22 are provided for sending and receiving information to and from the meter. Bearings are located to insure proper high speed rotation of the shafts 26 and 34.

The pendulous integrating gyro unit has a reference axis 28, a spin and pendulous axis 30, and an output axis 32.

In operation, the specified angle shaft 34 is rotated with respect to the case 10 by the specified angle motor 18. The shaft in turn rotates the outer ring of the angle transducer 36. The ring is rotated at the same angular rate with respect to the case 10 as the gyro 14 is programmed to have. The gyro turntable is rotated by the servo motor 12 which also rotates the inner rotor 38 of the angle transducer 16. The difference in degrees between the angles of the two shafts will provide the deviation from the programmed velocity change. The information is taken from the slip rings 20 and 21, where it is sent to the deviation velocity block of the missile guidance system which in turn commands the thrust control equipment thereby redirecting, increasing or decreasing the speed of the missile as needed.

Although the invention has been described with reference to a particular embodiment, it will be understood to those skilled in the art that the invention is capable of a variety of alternative embodiments within the spirit and scope of the appended claims.

I claim:

1. An inertial guidance system for sensing velocity change in missiles comprising: a case for mounting sensing components; a first motor; a shaft extending from said motor along the longitudinal axis of the case and having mounted thereon an accelerometer means and an angle sensing means component; a second motor; a shaft extending from said motor along the longitudinal axis of the case and having a complementary angle sensing means component thereon whereby said second motor rotates said shaft at a programmed rate and said first motor activates the accelerometer means whereby any difference between the shaft rotation will create a corresponding signal at the angle sensing means.

2. An inertial guidance system according to claim 1 wherein: the accelerometer means is a pendulous integrating gyro accelerometer.

3. An inertial guidance system according to claim 1 wherein: the angle sensing means is a resolver unit.

4. An inertial guidance system according to claim 1 wherein: the said second motor is a stepper motor.

\* \* \* \* \*